May 12, 1925.  1,537,281
F. WUNSCH
ELECTRICAL MEASURING APPARATUS
Filed April 28, 1923   2 Sheets-Sheet 1
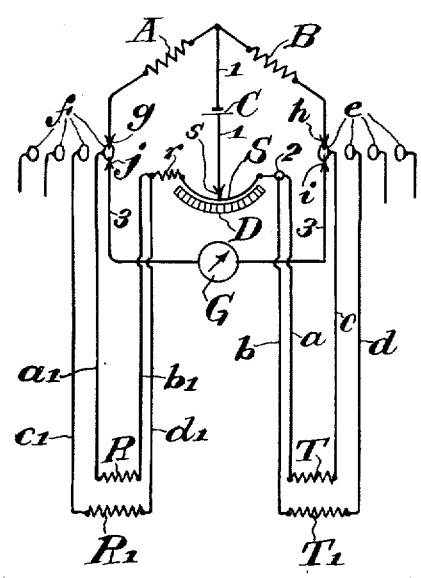
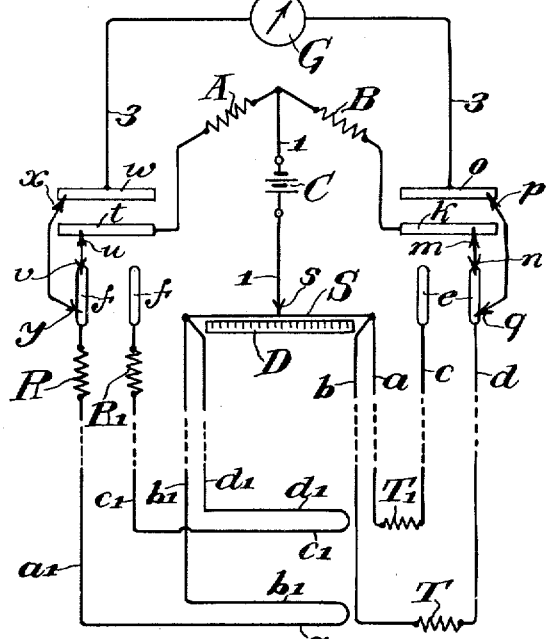
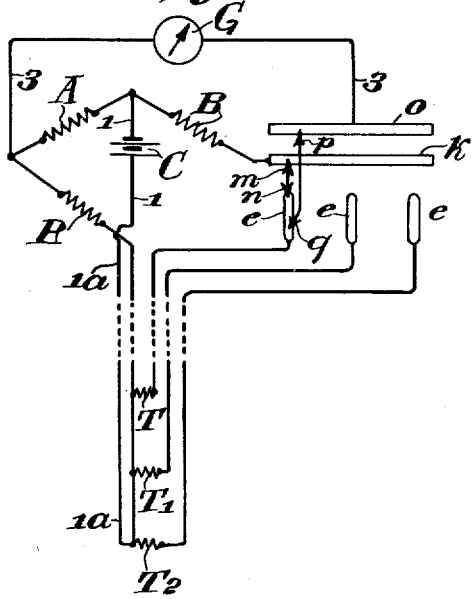
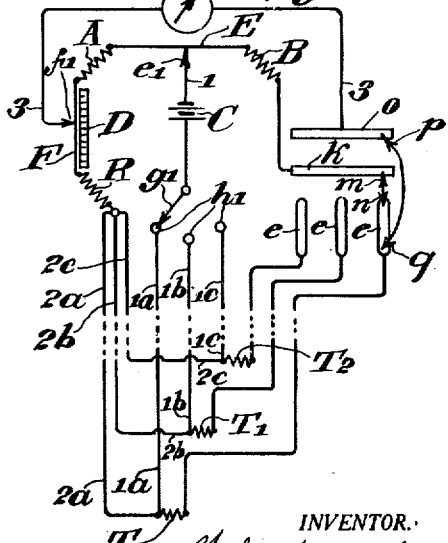
INVENTOR.
Felix Wunsch
BY
Cornelius D. Ehret
his ATTORNEY.

May 12, 1925. 1,537,281
F. WUNSCH
ELECTRICAL MEASURING APPARATUS
Filed April 28, 1923 2 Sheets-Sheet 2

INVENTOR.
Felix Wunsch
BY
Cornelius L. Ehret
His ATTORNEY.

Patented May 12, 1925.

1,537,281

UNITED STATES PATENT OFFICE.

FELIX WUNSCH, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA.

ELECTRICAL MEASURING APPARATUS.

Application filed April 28, 1923. Serial No. 635,202.

*To all whom it may concern:*

Be it known that I, FELIX WUNSCH, a citizen of the United States, residing in the city and county of Philadelphia, State of Pennsylvania, have invented new and useful Improvements in Electrical Measuring Apparatus, of which the following is a specification.

My invention relates to electrical measuring apparatus of the Wheatstone bridge type, and particularly to Wheatstone bridges utilized for measurement of temperatures.

In accordance with my invention, there are utilized a plurality of unknown resistances, as thermometer resistances, with a single Wheatstone bridge provided with switching mechanism for switching the several unknown resistances, as thermometer resistances, and in some instances for switching also simultaneously correlated resistances, individually into and out of co-operative relation with the bridge, the contacts of the switching mechanism being so disposed and arranged that the variable and uncertain resistances arising and occasioned at contacts between switch elements are outside of and have no effect upon the amount of resistance in those arms of the bridge including or containing the unknown or thermometer resistances and the correlated resistances other than those in the ratio arms of the bridge.

My invention resides in electrical measuring apparatus of the character hereinafter described and claimed.

For an illustration of some of the many forms my invention may take, reference may be had to the accompanying drawings, in which:

Fig. 1 is a diagrammatic view of a Wheatstone bridge provided with switching mechanism in accordance with my invention.

Fig. 1ª is a diagrammatic view of a four lead arrangement in accordance with my invention.

Fig. 2 is a diagrammatic view of a deflection arrangement in accordance with my invention.

Fig. 3 is a diagrammatic view of a three lead arrangement embodying my invention.

Figure 5:
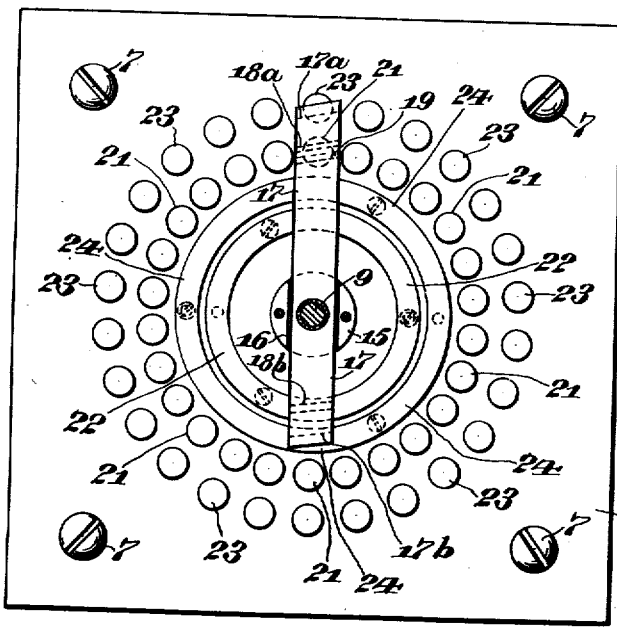
Fig. 5 is a sectional view, largely in elevation, on the line 5—5 of Fig. 4.

Referring to Fig. 1, there is shown a Wheatstone bridge in whose ratio arms are included the resistances A and B and in whose other arms are included the unknown or thermometer resistance T with the correlated resistance R, the number of thermometer resistances and correlated resistances being multiplied to any suitable or desired number, and switching mechanism for switching into co-operative relation with the Wheatstone bridge, individually and dissimultaneously, the different unknown or thermometer resistances $T$, $T^1$, etc. and their correlated resistances $R$, $R^1$, etc. In the arm of the bridge into which are switched the correlated resistances $R$, $R^1$, etc. may be disposed a fixed resistance $r$ utilized in connection with all of the resistances $R$, $R^1$, etc. Joining the arms containing the unknown or thermometer resistances and the correlated resistances is the slide wire S, along which is movable the contact $s$ at the terminal of the conjugate conductor 1, including the source of current or battery C, and whose other terminal is connected to the junction of the arms containing the ratio resistances A and B. The leads $a$ and $b$, etc. extending, respectively, to one terminal of the unknown or thermometer resistances $T$, $T^1$, etc., which are generally located at a distance from the bridge, are joined at the instrument binding post 2, which connects with one end of the slide wire S. The return leads $c$, $d$, etc. from the other terminals of the unknown or thermometer resistances $T$, $T^1$, etc. are permanently connected, as by soldering, with the different fixed or stationary switch contacts $e$, $e$, etc., respectively. The leads $a$, $b$, $c$, $d$, etc. are themselves resistances.

The correlated resistances $R$, $R^1$, etc. may be disposed adjacent the resistances $T$, $T^1$, etc., and connected in the bridge arms with $r$ by the leads $a^1$, $b^1$, $c^1$, $d^1$, whose resistances are equal to the resistances of the leads $a$, $b$, $d$, $c$. The leads $a^1$, $c^1$, etc. are permanently connected, as by soldering, with the stationary or fixed switch contacts $f$, $f$, etc., respectively.

The ratio arm containing the resistance A terminates in a movable switch contact $g$ adapted to engage and connect with any of the switch contacts $f$. Similarly, the ratio arm containing the resistance B terminates in a movable switch contact $h$ adapted to engage and contact with each of the switch contacts $e$, with which are adapted to engage and contact also the movable switch contact $i$ forming one terminal of the second conjugate conductor 3, including the galvanometer G, the conjugate conductor 3 terminating at its other end in the movable switch contact $j$ adapted to engage any one of the switch contacts $f$. The movable switch contacts $g$, $h$, $i$ and $j$ may be mechanically coupled so as to move in unison to bring the ratio arms and the galvanometer G simultaneously into co-operation with any unknown or thermometer resistance T, $T^1$, etc. and its correlated resistance R, $R^1$, etc.

In the position of the switching mechanism illustrated in Fig. 1, the galvanometer G and the ratio arms are in co-operative relation with the unknown or thermometer resistance T and its correlated resistance R. By moving contacts $j$ and $g$ toward the left to the next contact $f$, and by moving the contacts $g$ and $i$ to the right to the next contact $e$, the second unknown or thermometer resistance $T^1$ and its correlated resistance $R^1$ will be brought into co-operative relation with the bridge.

In the position of the switching mechanism illustrated in Fig. 1, it will be noted that the leads $a$ and $c$ of the unknown or thermometer resistance T are permanently connected, that is, connected without contact resistance or variable or changeable contact resistance with one end of the slide wire S and a switch contact $e$. The resistance of contact between the movable switch element $h$ and the fixed switch element or contact $e$ is therefore not in the arm containing the unknown or thermometer resistance T, but in that ratio arm of the bridge containing the resistance B. The resistance of the contact between the movable switch contact $i$ and the switch contact $e$ is a matter of indifference, since it occurs in a conjugate conductor and does not affect in any way the balance of the bridge; and the contact resistance between the movable contact $h$ and contact $e$ is in effect beyond the point of junction between the conjugate conductor 3 and the arm containing the resistance T, and therefore the contact resistance at $h$ is not in the arm containing the resistance T, but is in the ratio arm containing the resistance B. Similarly, the resistance at and between the movable switch contact $g$ and fixed switch contact $f$ is in that ratio arm of the bridge containing the resistance A, and is not in that arm of the bridge containing the correlated resistance R. The contact resistance between the movable contact $j$ and the contact $f$ is in the conjugate conductor 3, and therefore does not affect the balance of the bridge, and the contact resistance between $g$ and $f$ is in effect beyond the junction of the conjugate conductor 3 with the bridge arm containing the resistance R, and is therefore in a ratio arm of the bridge. Therefore, the contact resistances, that is, the resistances of the contacts at and between $h$ and $e$, on the one hand, and $g$ and $f$ on the other hand, are in and confined to the ratio arms of the bridge containing the ratio resistances A and B, whose magnitudes are made relatively great as compared with the magnitudes of the resistances T, R and $T^1$, $R^1$, etc., with the result that such variations as may occur in the magnitudes of the contact resistances at the different contacts $e$ and $f$, or upon successive engagements of any of the contacts $e$, $f$ by the co-acting contacts $h$ and $g$, respectively, introduce less error into the readings, inasmuch as such contact resistances are in arms containing resistances of relatively great magnitudes, and therefore the contact resistances are in effect swamped or diluted, and variations in the contact resistances are in consequence of relatively smaller effect than if they occurred in the arm containing the smaller unknown or thermometer resistance or in the arm containing the correlated resistance.

For any setting of the switching mechanism the contact $s$ is moved along the slide wire S to such position that the deflection of the galvanometer G is null, in which case the bridge is in balance, and the unknown resistance, or the temperature to which the thermometer resistance is subjected, may be read upon the scale D associated with the slide wire S and the movable contact $s$, the scale D having markings at which the movable contact $s$ points, the scale D being calibrated in any suitable units, as resistance, temperature, etc.

In Fig. 1ª the arrangement is in general the same as that of Fig. 1, except that the resistances R, $R^1$, etc. are located at or adjacent the bridge.

In this example of my invention the leads $c$ and $d$ again connect with different fixed switch contacts $e$, the ratio arm containing the resistance B being permanently connected to the elongated switch contact $k$, along which is movable the switch contact $m$ connected to the switch contact $n$, by which the ratio arm may be connected to any one of the switch contacts $e$. One terminal of the conjugate conductor 3 permanently connects with the elongated switch contact $o$, upon which is movable the contact $p$ connected with the contact $q$, which may contact with the different contacts $e$. Here again the ratio arm containing resistance B connects to the different switch contacts $e$ at points beyond the points of connection or application of the conjugate conductor 3, and as before the contact resistances at the movable contacts $n$ and $m$ are in a ratio arm of the bridge and not in an arm containing the unknown or thermometer resistance, the resistances A and B in the ratio arms being again of relatively high magnitudes to render less important or effective the contact resistances at contacts $n$ and $m$.

Similarly, the correlated resistances R, $R^1$, etc. are permanently connected to the switch contacts $f$. The other ratio arm is permanently connected to the elongated switch contact $t$, along which is movable the contact $u$ connected to the contact $v$, which is adapted to engage the different contacts $f$. The other end of the conjugate conductor 3 permanently connects with the elongated switch contact $w$, along which is movable the contact $x$ connected to the movable contact $y$, adapted to engage the different contacts $f$. Here again the contact resistances at contacts $v$ and $u$ are in the ratio arm, and not in the arm containing the correlated resistance. In this instance, again, in series with each correlated resistance and forming a part of the same bridge arm therewith is a pair of leads, one outgoing and one returning, extending to a point adjacent the unknown or thermometer resistances. In the example illustrated, the two leads associated with the correlated resistance R are indicated at $a^1$ and $b^1$; and the leads in circuit with the resistance $R^1$ are indicated at $c^1$ and $d^1$. These leads are themselves resistances.

In the case of Fig. 1ª again the contact $s$ is moved along the slide wire S until the bridge is in balance, whereupon the magnitude of the unknown resistance or the temperature to which the thermometer resistance is subjected is determinable from the scale D co-acting with the movable contact $s$, the scale D being again calibrated in any suitable units, as those of resistance, temperature, etc.

To bring into relation with the bridge a second unknown or thermometer resistance, as $T^1$, the four movable contacts at the right are moved further to the left to bring the contacts $n$ and $q$ into engagement with the next contact $e$; and the four contacts at the left are moved further toward the right to bring the contacts $v$ and $y$ into engagement with the next contact $f$. By preference the eight contacts are mechanically coupled so as to be moved in unison with a suitable switching mechanism.

In Fig. 2 is shown an arrangement in which the conjugate conductor 1 is connected by a lead 1ª extending to the several unknown or thermometer resistances T, $T^1$, $T^2$, etc., with which is associated a common or single correlated resistance R in another arm of the bridge extending to the unknown or thermometer resistances. The unknown or thermometer resistances permanently connect with the stationary switch contacts $e$, $e$, etc. The ratio arm containing the resistance B connects with the elongated switch contact $k$, with which co-acts the movable contact $m$ connected to the movable contact $n$ adapted to engage the different contacts $e$. One terminal of the conjugate conductor 3 connects to the elongated switch contact $o$, with which co-acts the movable contact $p$ connected to the movable contact $q$, which co-acts with the different contacts $e$, this arrangement being similar to that indicated to the right of Fig. 1ª.

Here again the contact resistances at $n$ and $m$ are in a ratio arm, and not in the arm of the bridge containing the unknown or thermometer resistance, the resistance B again having relatively great magnitude as compared with the unknown or thermometer resistance, whereby the effect of the contact resistances is minimized.

With the switching mechanism in any position, for example, that illustrated, a change in the magnitude of the unknown or thermometer resistance T causes an unbalancing of the bridge, with resultant deflection of the needle or movable system of the galvanometer G, the extent of deflection being a measure of the unknown resistance or temperature to which the resistance T is subjected.

In this instance, again the four contacts $p$, $m$, $n$ and $q$ are mechanically coupled to move in unison to bring into cooperative relation with the bridge the different unknown or thermometer resistances.

While in Fig. 2 an arrangement has been indicated, as aforesaid, for utilization in accordance with the deflection method, it will readily be understood that the same arrangement may be used in a null method, as by utilizing in the bridge of Fig. 2 the slide wires E and F and their associated parts, as indicated in Fig. 3.

Fig. 3 illustrates an arrangement embodying my invention and in a type of Wheatstone bridge of the character disclosed in prior Letters Patent No. 1,097,651, May 26, 1914. The ratio arm of the bridge containing resistance B, one terminal of the conjugate conductor 3 and the contacts $e$ to which the unknown or thermometer resistances are permanently connected are again associated with movable contact structure, as in Figs. 1ª and 2. A slide wire E connects the ratio arms, and with it co-acts the movable contact $e^1$ forming a terminal of the conjugate conductor 1. A second slide wire F connects the ratio arm containing the resistance A and that arm of the bridge containing the single correlated resistance R common to the different unknown or thermometer resistances T, $T^1$, $T^2$, etc. Co-acting with the slide wire F is the movable contact $f^1$, the two contacts $e^1$ and $f^1$ being suitably mechanically coupled so that they move in unison along the respective slide wires, whereby notwithstanding adjustment of the contact $f^1$ along the slide wire F to balance the bridge in taking a reading, when no current flows through the galvanometer G, the ratio of the resistances in the ratio arms containing resistances A and B remains constant.

In the conjugate conductor 1 is a movable switch arm or contact $q^1$ co-acting with the several switch contacts $h^1$, whereby the several conjugate conductor leads $1^a$, $1^b$, $1^c$, etc., one for each of the unknown or thermometer resistances, are brought individually into circuit. These leads, and the lead $1^a$ of Fig. 2, constitute means extending to a distance from the bridge to connect an unknown or thermometer resistance to a conjugate conductor of the bridge. For the unknown or thermometer resistances are provided also the leads $2^a$, $2^b$, $2^c$, etc., one for each of the unknown or thermometer resistances, these last named leads being in the same bridge arm with the resistance R and extending to common junction points with the corresponding conjugate conductor leads leads and terminals of the unknown or thermometer resistances. In this instance, the switch contact $q^1$ in the conjugate conductor 1 may move in unison with the movable contacts $p$, $m$, $n$ and $q$, whereby as different unknown or thermometer resistances are brought into circuit, different and corresponding conjugate conductor leads are brought into circuit.

Here again the contact resistances of contacts $m$ and $n$ are always in a ratio arm of the bridge, and not in an arm containing the unknown or thermometer resistance.

With any one of the unknown or thermometer resistances in the circuit, the contacts $e^1$ and $f^1$ are moved in unison along their respective slide wires E and F until a bridge balance is obtained, as indicated when the deflection of the galvanometer G is zero. The magnitude of the unknown resistance or the temperature to which the thermometer resistance is subjected may then be read off on the scale D associated with either of the slide wires E or F, the corresponding movable contact serving to point to the proper scale reading, the scale being calibrated in any suitable units, as of resistance, temperature, etc.

In this example, there are three leads for each unknown or thermometer resistance, one in the bridge arm with the resistance R, one in the conjugate conductor 1, and one extending to the switch contact $e$.

Figure 4:
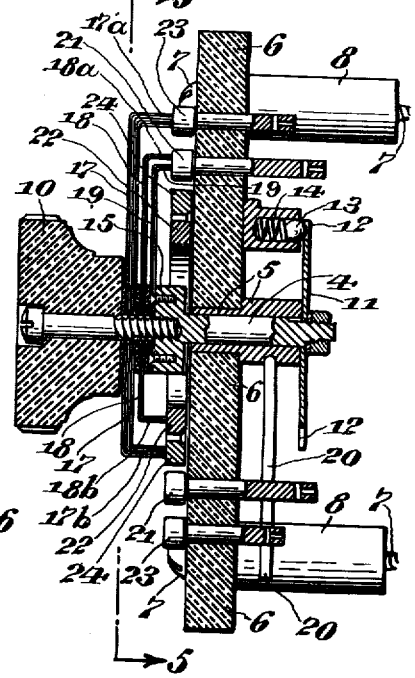
Fig. 4 is a sectional view, parts in elevation, of switching mechanism utilizable in accordance with my invention.
Figure 6:
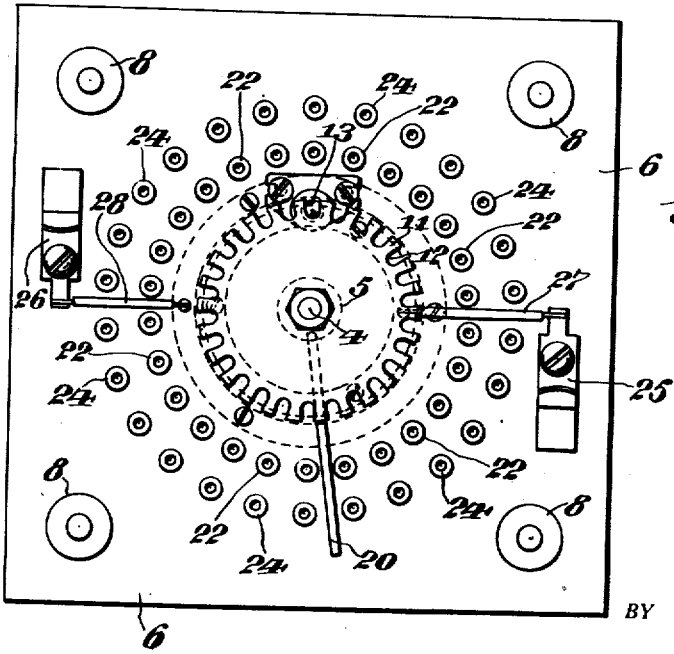
Fig. 6 is an elevational view of the right side of the structure of Fig. 4.

Referring to Figs. 4, 5 and 6, there is shown one of various forms of switching mechanism of the character and for the purpose hereinbefore described. In the example illustrated in these figures, the switching mechanism is suited for an arrangement such as illustrated in Fig. 3.

In the example illustrated, the switching mechanism is utilizable for bringing into co-operation with the Wheatstone bridge a relatively large number of unknown or thermometer resistances, it being understood that the same structure or equivalent structure may be utilized for bringing into relation with the bridge any greater or lesser number of unknown or thermometer resistances.

The central rotatable metallic shaft or stud 4 has a bearing in the sleeve 5 carried by the base 6, preferably of insulating material. The base 6 may be secured to any suitable support, as by screws 7 extending through the members 8 serving to space the base 6 and the parts carried thereby from the support. Secured to the shaft 4 by screw 9 is the operating knob or handle 10; and at the opposite end of the shaft 4 is secured a disk 11 having notches 12, with which co-acts the ball 13 pressed outwardly by the spring 14 to yieldingly lock the shaft 4 and attached parts in its different positions.

The shaft 4 has an enlargement or head 15 having the transverse slot 16, in which are disposed the laminated or equivalent switch brushes or movable contact members 17, 18 and 19, all insulated from each other, and the members 17 and 18 insulated also from the shaft 4 and its head 15, while the member 19 is secured in electrical contact with the head 15.

Connected to the bearing sleeve 5 is the member 20, to which is connected one terminal of the galvanometer G, Fig. 3, as by the conjugate conductor 3, the shaft corresponding with the contact $p$ and the stationary sleeve 5 corresponding with the stationary contact $o$ of Fig. 3. The downwardly turned end of the brush 19 and the downwardly turned end $18^a$ of the brush 18 engage and contact with the series of studs 21, while the opposite end $18^b$ of the brush 18 engages the circumferentially continuous contact ring 22. The downwardly turned end $17^a$ of the brush 17 engages the series of studs 23, while the opposite end $17^b$ of the brush 17 engages the circumferentially continuous ring contact 24.

The studs or switch contacts 21 correspond with the switch contacts $e$ of Fig. 3, the brush 19 co-acting with these contacts corresponding with the contact $q$ of Fig. 3 controlling the conjugate conductor 3 and the included galvanometer G. The brush end $18^a$ corresponds with the movable contact $n$ and the brush end $18^b$ corresponds with the movable contact $m$, the contact ring 22 corresponding with the contact $k$, Fig. 3, the contact ring 22 being permanently connected to the ratio arm containing the resistance B. The studs 23 correspond with the switch contacts $h^1$ and the co-acting brush end $17^a$ corresponds with the switch contact $g^1$, the contact ring 24, continuously engaged by the brush 17, being permanently connected to one terminal of the battery C, Fig. 3. For convenience the connections to the contact rings 22 and 24 may be made through the binding posts or connectors 25 and 26, respectively, connected by insulated conductors 27 and 28, respectively, with the contact rings 22 and 24.

It will be noted that the brushes 18 and 19 are insulated from each other, though the end $18^a$ of brush 18 and the brush 19 contact at the same time with a stud 21. The contact at and between the end of the brush 19 and stud 21 effects connection of the conjugate conductor 3 and galvanometer G with the stud 21, while the brush end $18^a$ engages the stud 21 at a point outside of and beyond the point of contact of brush 19 with stud 21, whereby the contact resistance between brush end $18^a$ and stud 21 is in the ratio arm containing the resistance B and is outside of the arm including any of the studs 23 which permanently connect with the several unknown or thermometer resistances. By this arrangement and structure, therefore, the principle of the switching mechanism of Figs. 1 to 3 inclusive is effected.

While the switching mechanism of Figs. 4, 5 and 6 is illustrated as manually operated, it will be understood that the switching mechanism may be associated with suitable automatic recording or control mechanism, such, for example, as disclosed in prior Letters Patent No. 1,125,699, January 19, 1915, in which case the Wheatstone bridge with its galvanometer G will be utilized in controlling the mechanism of said Letters Patent in lieu of the potentiometer and galvanometer G therein disclosed, and the switching mechanism of Figs. 4, 5 and 6 hereof will have its movable structure operated as is the movable structure 107 of the switching mechanism of said Letters Patent, whereby the different unknown or thermometer resistances disclosed herein will be successively brought into co-operation with the Wheatstone bridge whose galvanometer in turn will control the mechanism of said Letters Patent.

As well known in the art of Wheatstone bridges, the galvanometer G and source of current C may be interchanged in their positions, as by transferring the galvanometer G to the conjugate conductor 1 and the source C to the conjugate conductor 3.

While the devices T, $T^1$, etc. have been herein referred to as unknown or thermometer resistances, such as non-inductive or non-reactive resistances, it shall be understood that they represent as well electrolytic resistances, inductive resistances or reactances and condensers or capacitative reactances, it being understood that when they are reactive, as when inductive resistances or condensers, or when electrolytic in nature, the source of current C will preferably be of a character delivering fluctuating or alternating current. The devices A and B in the ratio arms and the devices R, $R^1$, etc. will be non-reactive, reactive or electrolytic in character as may be suitable or necessary properly to co-act with the devices T, $T^1$, etc. Accordingly, the terms "resistance," "unknown resistance" in the appended claims include non-inductive, electrolytic and inductive resistances, and condensers.

What I claim is:

1. The combination with a Wheatstone bridge and a plurality of resistances to be selectively included in an arm of said bridge, of switching mechanism comprising a contact member for each of said resistances and movable contacts for bringing a conjugate conductor and a ratio arm of said bridge into engagement with a selected contact member in such relation that the contact resistance between said contact member and the movable contact connected to the ratio arm is excluded from the bridge arm including said contact member and its resistance.

2. The combination with a Wheatstone bridge and a plurality of resistances to be selectively included in an arm of said bridge, of switching mechanism comprising a contact member for each of said resistances and contacts movable in unison with each other for bringing a conjugate conductor and a ratio arm of said bridge simultaneously into engagement with a selected contact member in such relation that the contact resistance between said contact member and the movable contact connected to the ratio arm is excluded from the bridge arm including said selected contact member and its resistance.

3. The combination with a Wheatstone bridge and a plurality of unknown resistances to be selectively included in an arm of said bridge, of switching mechanism comprising a contact member for each of said unknown resistances and a movable contact connected with a conjugate conductor of said bridge adapted to engage a selected one of said contact members, and a movable contact connected with a ratio arm of said bridge and adapted to engage said selected contact member at a point beyond engagement of said first named contact with said contact member, whereby the contact resistance between a selected contact member and the contact connected with said ratio arm is brought into said ratio arm.

4. The combination with a Wheatstone bridge and a plurality of unknown resistances to be selectively included in an arm of said bridge, of switching mechanism comprising a contact member for each of said unknown resistances and a movable contact connected with a conjugate conductor of said bridge adapted to engage a selected one of said contact members, a movable contact connected with a ratio arm of said bridge adapted to engage a selected one of said contact members at points beyond engagement of said first named contact with said contact members, whereby the contact resistance between a selected contact member and the contact connected with said ratio arm is brought into said ratio arm, and means for effecting movement of said movable contacts in unison with each other.

5. The combination with a Wheatstone bridge and a plurality of unknown resistances to be selectively included in an arm of said bridge, of switching mechanism comprising a contact member for each of said unknown resistances and movable contacts for bringing a conjugate conductor and a ratio arm of said bridge into engagement with a selected contact member in such relation that the contact resistance between a selected contact member and the movable contact connected to the ratio arm is excluded from the bridge arm including said unknown resistances, and similar switching mechanism for bringing the other ratio arm into co-operative relation with correlated resistances in the fourth arm of said bridge.

6. The combination with a Wheatstone bridge and a plurality of unknown resistances to be selectively included in an arm of said bridge, of switching mechanism comprising a contact member for each of said unknown resistances and movable contacts for bringing a conjugate conductor and a ratio arm of said bridge simultaneously into engagement with a selected contact member in such relation that the contact resistances between said contact members and the movable contact connected to the ratio arm is excluded from the bridge arm including said unknown resistances, similar switching mechanism for bringing the other ratio arm into co-operative relation with correlated resistances in the fourth arm of said bridge, and means for effecting movement of the movable contacts of said switching mechanisms in unison with each other.

7. The combination with a Wheatstone bridge and a plurality of unknown resistances to be selectively included in an arm of said bridge, of switching mechanism comprising a contact member for each of said unknown resistances and movable contacts for bringing a conjugate conductor and a ratio arm of said bridge into engagement with a selected contact member in such relation that the contact resistance between said contact member and the movable contact connected to the ratio arm is excluded from the bridge arm including said unknown resistances, there being compensating leads in the fourth arm of said bridge, and similar switching mechanism for bringing the other ratio arm into co-operative relation with said compensating leads.

8. The combination with a Wheatstone bridge and a plurality of unknown resistances to be selectively included in an arm of said bridge, of switching mechanism comprising a contact member for each of said unknown resistances and movable contacts for bringing a conjugate conductor and a ratio arm of said bridge into engagement with a selected contact member in such relation that the contact resistance between said contact member and the movable contact connected to the ratio arm is excluded from the bridge arm including said unknown resistances, there being compensating leads in the fourth arm of said bridge, similar switching mechanism for bringing the other ratio arm into co-operative relation with said compensating leads, and means for effecting movement of the movable contacts of said switching mechanisms in unison with each other.

9. The combination with a Wheatstone bridge and a plurality of resistances to be included in an arm of said bridge, of switching mechanism comprising a contact member for each of said resistances and an elongated contact member connected with a ratio arm of said bridge, movable contacts connected to each other and engaging, respectively, one of said contact members and said elongated contact member, and a movable contact connected with a conjugate conductor of said bridge and adapted to engage one of said contact members, the movable contacts co-acting with said first named contact members engaging therewith in such relation that the contact resistances between said first named contact members and the movable contact connecting with said ratio arm are excluded from the arm of said bridge including said resistances.

10. The combination with a Wheatstone bridge and a plurality of resistances to be included in an arm of said bridge, of switching mechanism comprising a contact member for each of said resistances and an elongated contact member connected with a ratio arm of said bridge, movable contacts connected to each other and engaging, respectively, one of said contact members and said elongated contact member, a movable contact connected with a conjugate conductor of said bridge and adapted to engage one of said contact members, the movable contacts co-acting with said first named contact members engaging therewith in such relation that the contact resistances between said first named contact members and the movable contact connecting with said ratio arm are excluded from the arm of said bridge including said resistances, and means for effecting movement of said movable contacts in unison with each other.

11. The combination with a Wheatstone bridge and a plurality of resistances to be included in an arm of said bridge, of switching mechanism comprising a contact member for each of said resistances and an elongated contact member connected with a ratio arm of said bridge, movable contacts connected to each other and engaging, respectively, one of said contact members and said elongated contact member, a stationary contact connected with a conjugate conductor of said bridge, and movable contacts connected to each other and engaging said stationary contact and one of said first named contact members, the movable contacts coacting with said first named contact members and engaging therewith in such relation that the contact resistances between said first named contact members and the movable contact connecting with said ratio arm are excluded from the arm of said bridge including said resistances.

12. The combination with a Wheatstone bridge and a plurality of resistances to be included in an arm of said bridge, of switching mechanism comprising a contact member for each of said resistances and movable contacts for bringing a conjugate conductor and a ratio arm of said bridge simultaneously into engagement with a contact member in such relation that the contact resistances between said contact members and the movable contact connected to the ratio arm are excluded from the bridge arm including said resistances, and switching mechanism connecting the second conjugate conductor of said bridge with said resistances.

13. The combination with a Wheatstone bridge and a plurality of resistances to be included in an arm of said bridge, of switching mechanism comprising a contact member for each of said resistances and movable contacts for bringing a conjugate conductor and a ratio arm of said bridge simultaneously into engagement with a contact member in such relation that the contact resistances between said contact members and the movable contact connected to the ratio arm are excluded from the bridge arm including said resistances, switching mechanism connecting the second conjugate conductor of said bridge with said resistances, and means for effecting movement of the movable contacts of said switching mechanisms in unison with each other.

14. The combination with a Wheatstone bridge and a plurality of resistances to be included in an arm of said bridge, of switching mechanism comprising a series of contact members for said resistances, movable contacts engaging said contact members, one of said contacts connected to a conjugate conductor of said bridge, a stationary contact member connected with a ratio arm of said bridge, and a movable contact engaging said last named stationary contact member and connected with the other of said first named movable contacts, said first named movable contacts disposed in such relation with respect to said first named contact members that the contact resistances between said contact members and that one of said movable contacts connected with the ratio arm are excluded from the bridge arm including said resistances, and means for rotating all said movable contacts in unison with each other.

In testimony whereof I have hereunto affixed my signature this 25th day of April, 1923.

FELIX WUNSCH.

bridge including said resistances, and means for effecting movement of said movable contacts in unison with each other.

11. The combination with a Wheatstone bridge and a plurality of resistances to be included in an arm of said bridge, of switching mechanism comprising a contact member for each of said resistances and an elongated contact member connected with a ratio arm of said bridge, movable contacts connected to each other and engaging, respectively, one of said contact members and said elongated contact member, a stationary contact connected with a conjugate conductor of said bridge, and movable contacts connected to each other and engaging said stationary contact and one of said first named contact members, the movable contacts co-acting with said first named contact members and engaging therewith in such relation that the contact resistances between said first named contact members and the movable contact connecting with said ratio arm are excluded from the arm of said bridge including said resistances.

12. The combination with a Wheatstone bridge and a plurality of resistances to be included in an arm of said bridge, of switching mechanism comprising a contact member for each of said resistances and movable contacts for bringing a conjugate conductor and a ratio arm of said bridge simultaneously into engagement with a contact member in such relation that the contact resistances between said contact members and the movable contact connected to the ratio arm are excluded from the bridge arm including said resistances, and switching mechanism connecting the second conjugate conductor of said bridge with said resistances.

13. The combination with a Wheatstone bridge and a plurality of resistances to be included in an arm of said bridge, of switching mechanism comprising a contact member for each of said resistances and movable contacts for bringing a conjugate conductor and a ratio arm of said bridge simultaneously into engagement with a contact member in such relation that the contact resistances between said contact members and the movable contact connected to the ratio arm are excluded from the bridge arm including said resistances, switching mechanism connecting the second conjugate conductor of said bridge with said resistances, and means for effecting movement of the movable contacts of said switching mechanisms in unison with each other.

14. The combination with a Wheatstone bridge and a plurality of resistances to be included in an arm of said bridge, of switching mechanism comprising a series of contact members for said resistances, movable contacts engaging said contact members, one of said contacts connected to a conjugate conductor of said bridge, a stationary contact member connected with a ratio arm of said bridge, and a movable contact engaging said last named stationary contact member and connected with the other of said first named movable contacts, said first named movable contacts disposed in such relation with respect to said first named contact members that the contact resistances between said contact members and that one of said movable contacts connected with the ratio arm are excluded from the bridge arm including said resistances, and means for rotating all said movable contacts in unison with each other.

In testimony whereof I have hereunto affixed my signature this 25th day of April, 1923.

FELIX WUNSCH.

Certificate of Correction.

It is hereby certified that in Letters Patent No. 1,537,281, granted May 12, 1925, upon the application of Felix Wunsch, of Philadelphia, Pennsylvania, for an improvement in "Electrical Measuring Apparatus," errors appear in the printed specification requiring correction as follows: Page 6, line 42, claim 6, for the word "resistances" read *resistance*, and line 43, for the word "members" read *member*; and that the said Letters Patent should be read with these corrections therein that the same may conform to the record of the case in the Patent Office.

Signed and sealed this 18th day of August, A. D. 1925.

[SEAL.]

KARL FENNING,
*Acting Commissioner of Patents.*

Certificate of Correction.

It is hereby certified that in Letters Patent No. 1,537,281, granted May 12, 1925, upon the application of Felix Wunsch, of Philadelphia, Pennsylvania, for an improvement in " Electrical Measuring Apparatus," errors appear in the printed specification requiring correction as follows: Page 6, line 42, claim 6, for the word " resistances " read *resistance*, and line 43, for the word " members " read *member;* and that the said Letters Patent should be read with these corrections therein that the same may conform to the record of the case in the Patent Office.

Signed and sealed this 18th day of August, A. D. 1925.

[SEAL.]
KARL FENNING,
*Acting Commissioner of Patents.*